(12) United States Patent
Stehr

(10) Patent No.: US 11,946,836 B2
(45) Date of Patent: Apr. 2, 2024

(54) SUCTION PARTICLE DETECTION SYSTEM HAVING A WALL OR CEILING FEEDTHROUGH

(71) Applicant: Wagner Group GmbH, Langenhagen (DE)

(72) Inventor: Peter Stehr, Wunstorf (DE)

(73) Assignee: Wagner Group GmbH (DE)

( * ) Notice: Subject to any disclaimer, the term of this patent is extended or adjusted under 35 U.S.C. 154(b) by 580 days.

(21) Appl. No.: 17/054,689

(22) PCT Filed: May 21, 2019

(86) PCT No.: PCT/EP2019/063122
§ 371 (c)(1),
(2) Date: Jan. 26, 2021

(87) PCT Pub. No.: WO2019/224203
PCT Pub. Date: Nov. 28, 2019

(65) Prior Publication Data
US 2021/0140855 A1   May 13, 2021

(30) Foreign Application Priority Data
May 24, 2018 (EP) .................................. 18020228

(51) Int. Cl.
*G01N 1/22* (2006.01)
*F16L 5/02* (2006.01)
*G08B 17/113* (2006.01)

(52) U.S. Cl.
CPC ............ *G01N 1/2273* (2013.01); *F16L 5/027* (2013.01); *G08B 17/113* (2013.01)

(58) Field of Classification Search
CPC .......... G01N 1/2273; G01N 2001/2285; F16L 5/027; F16L 5/00; G08B 17/113
See application file for complete search history.

(56) References Cited

FOREIGN PATENT DOCUMENTS

DE   102008042162 A1 *  3/2010 ........... F02M 55/005
DE   102016106250 A1    11/2016
(Continued)

OTHER PUBLICATIONS

English machine translation of Fraedrich (DE 10 2016 106 250 A1), Nov. 3, 2016 (Year: 2016).*
(Continued)

*Primary Examiner* — David Z Huang
(74) *Attorney, Agent, or Firm* — Frank H. Foster; Kremblas & Foster

(57) ABSTRACT

A suction particle detection system having a wall or ceiling feed-through (100) for fluidically connecting a pipe or hose end (200) to a test environment (300), the wall or ceiling feedthrough (100) comprising a line portion (110), which has a first line end (111) for fluidically connecting to the pipe or hose end (200) of the suction particle detection system and a second line end (112) arranged opposite the first line end (111), wherein the second line end (112) is formed with a suction opening (113), having a fastening means (120) for fixing the wall or ceiling feedthrough (100) within a feed-through opening (320) of a wall-like or ceiling-like room structure (310), and having a flange-like collar portion (114), which extends starting from the second line end (112) in the radial direction, the fastening means (120) having one or more deflectable springs (121).

14 Claims, 3 Drawing Sheets

(56) References Cited

FOREIGN PATENT DOCUMENTS

| FR | 3057315 A3 | 4/2018 | | |
|---|---|---|---|---|
| KR | 20020089748 A | * | 5/2001 | ........... E04G 15/061 |
| WO | 9323735 A1 | | 11/1993 | |
| WO | 2012176872 A1 | | 12/2012 | |
| WO | 2016131855 A2 | | 8/2016 | |
| WO | WO-2016131855 A2 | * | 8/2016 | ........... G01N 1/2273 |

OTHER PUBLICATIONS

English machine translation of Hanneke (DE 10 2008 042 162 A1), Mar. 18, 2010 (Year: 2010).*
English machine translation of Park (KR 2002-0089748), Nov. 30, 2002 (Year: 2002).*

\* cited by examiner

SUCTION PARTICLE DETECTION SYSTEM HAVING A WALL OR CEILING FEEDTHROUGH

BACKGROUND OF THE INVENTION

The invention relates to a wall or ceiling feedthrough for the fluid-conducting connection of a pipe or hose end of a suction particle detection system, in particular a suction fire detection system, to a test environment. The invention also relates to a suction particle detection system having a wall or ceiling feedthrough that connects a pipe or hose end of the suction particle detection system to a test environment in a fluid-conducting manner. The wall or ceiling feedthrough is equipped with a line section which has a first line end for fluid-conducting connection to a pipe or hose end of the suction particle detection system and a second line end arranged opposite to the first line end, wherein the second line end is designed having a suction opening, a fastening means for fixing the wall or ceiling feedthrough within a through opening of a wall-like or ceiling-like room structure, and a flange-like collar section which extends in the radial direction starting from the second line end. The invention additionally relates to an associated assembly method and the use of a fastening means for fixing the wall or ceiling feedthrough.

In the area of fire protection, in addition to active fire fighting, early detection of fires or their development is an important issue. Especially in closed areas in which people are located, e.g. in rooms of buildings or in the passenger area of trains, but also in rooms with high-quality or important equipment, such as server rooms, very early detection of a fire, preferably already during its development phase, is of decisive importance.

For this purpose, suction particle detection systems are used, in particular smoke suction systems, so-called suction smoke detectors, which continuously suck in a sufficiently representative amount of air from a test environment, the room or region to be monitored, and feed it to an integrated detector. Scattered light detectors are used as detectors, for example, which are integrated in the suction path and which detect the light scattering caused by scattered light or smoke particles in a scattered light center of the detector, or also point-shaped smoke detectors which measure the light turbidity caused by smoke aerosols in a detection chamber of the detector. A proven means of taking the representative amount of air and supplying it to the detector is a pipe and/or hose system in the form of pipe and/or hose lines having corresponding components such as connectors, valves, branches, and/or other fittings. A negative pressure is generated within the pipe and/or hose system, for example by means of a fan, so that air samples are taken and guided to the detector via so-called suction points, which have a suction opening. For this purpose, the suction points are each connected to a pipe or hose end so that their suction openings protrude into the room or region to be monitored at different positions and establish a fluid-conducting connection to the detection chamber. The connection between the pipe or hose end and the suction point has to be sufficiently tight so that no leakage flows occur and the amount of air taken reliably reaches the detector.

Ideally, the pipe and/or hose system is already structurally integrated during the construction phase of a building or a means of transportation, for example a train, so that the lines are concealed behind the wall-like or ceiling-like room structures that preferably delimit the test environment, in particular behind walls or ceilings, wall or ceiling paneling, so-called intermediate walls or intermediate ceilings, after completion of construction. In order that it is still possible to take the required amount of air, through openings penetrating wall or ceiling paneling are associated with the respective suction openings are associated, for example. In order to fix the pipe or hose ends within the through openings, the suction points are designed as wall or ceiling feedthroughs and have a flange-like cover that surrounds the intake opening, which in the installed state rests on the visible side of the wall or ceiling paneling and conceals the through opening. For this purpose, the diameter of the flange-like cover is expediently larger than the diameter of the through opening, so that it is completely covered after the installation. For fastening, the suction point is usually guided through the through opening and fastened to the wall or ceiling paneling using a lock nut arranged on the rear. For this purpose, the installer requires access to both sides, the visible side and the rear side, of the paneling, which is why installation always has to be provided in the vicinity of removable recessed lamps or inspection flaps. Access can then take place from the room to be monitored through the opening of the recessed lamp that has been removed or through the inspection flap to the rear of the paneling. If there is a sufficiently large intermediate space between the ceiling or wall and the respective paneling, the installer can alternatively go into this space himself and carry out the installation from there. Access to the rear side of the wall or ceiling paneling is obligatory for both alternative installation methods.

Installation devices for suction points of a smoke detection system are known from WO 1993/23735 A1. To fasten the suction point, in one embodiment a retaining means can be screwed to a through hole using the rear side or alternatively using the visible side of wall or ceiling paneling. Subsequently, a hollow socket provided with an external thread is guided through the through opening and screwed to an internal thread of the retaining means. The hollow socket is used to accommodate and guide a capillary hose end of the smoke detection system. The suction point itself is attached from the visible side so that an air sample can be conducted starting from its suction opening via the capillary hose end to the smoke detection system. In order to conceal the through hole and to facilitate the attachment of the suction point, the hollow socket can be equipped with a flower-shaped cover, which presses against the hollow socket when it is passed through the through hole and folds out as soon as the hollow socket reaches the visible side of the wall or ceiling paneling. The flower-shaped paneling then lies against the visible side of the wall or ceiling paneling, covering the through hole. Finally, the suction point is attached again. The disadvantage of this variant is the necessity of screwing a retaining means to the wall or ceiling paneling before the actual installation of the suction point.

In addition, the hollow socket has to be guided through the through hole starting from the rear of the wall or ceiling paneling, so that the flower-shaped cover can fold out on the other side, the visible side. Finally, the above-mentioned installation devices comprise a large number of different parts which have to be connected to one another in respective installation steps. This results in increased installation and manufacturing costs and a higher susceptibility to errors.

Another proposal for the installation and removal of suction points in a suction particle detection system is known from WO 2016/131855 A2. The goal here is to perform the installation of the suction points starting from the visible side of paneling. To fasten the suction point, a fastening means having fastening tongues adjustable via a ratchet strap is guided through the through opening of the paneling on its rear side. The fastening tongues extend in parallel to the paneling and are each connected to a resilient holding arm which extends in the vertical direction with respect to the paneling. In order to be able to guide the fastening tongues through the through opening, the holding arms are deflected radially inwards (horizontally or parallel to the paneling) and then return radially outwards to their original rest position. By means of the ratchet straps, the fastening tongues may be pulled vertically downwards along the holding arms, in the direction of the rear side of the paneling, whereby the fastening tongues then lie against the surface of the rear side and fix the fastening means. In order to be actuated by an installer, the ratchet straps have extensions which protrude from the through opening after the fastening means have been fixed. Before the actual suction point can be adhesively bonded into the fastening means from below, i.e., starting from the visible side, it is necessary to remove the extensions of the ratchet straps, for example by means of a knife. This installation method described also has a large number of individual installation steps and is therefore complex and error-prone to carry out. In particular, cutting off the ratchet strap extensions is cumbersome and requires an additional installation tool. The fastening means and the actual suction point are designed in two parts and have to be manufactured individually and perfectly fitting with one another. The profeedthroughion of the ratchet straps, which also consist of various individual parts and which first have to be assembled, also requires increased effort.

Solutions for one-sided fastening of LED recessed spotlights on wall or ceiling paneling are also known from the field of lighting technology. For their installation, for example in a suspended ceiling, the cables required for the power supply are first laid behind the suspended ceiling, wherein the respective connection cables are led through openings provided to accommodate the LED recessed spotlight. The recessed spotlights can then be connected to the cables protruding from the through openings. The recessed spotlights are then inserted into the through opening together with the housing and locked in place by means of a spring holder. For this purpose, the springs of the spring holder are pressed onto the housing of the recessed spotlight against their spring force during the insertion into the through opening. As soon as the housing has crossed the passage opening, the springs spring back and fix the recessed spotlight. The connected connection cables, which may be bent plastically with very little effort, are also pushed into the through opening when the recessed spotlight is inserted and hidden behind the ceiling suspension. The fastening means provided for the LED recessed spotlights can be manufactured with little effort and are easy to install, but offer little hold and are therefore only suitable for fastening particularly light components, such as the LED recessed spotlights. For removal, the recessed spotlights can easily be pulled out of the through openings against the spring force.

It is therefore an object of the present invention to provide improved means for fastening suction points of a suction particle detection system which enable simpler and more flexible installation, preferably starting from the visible side of a wall-like or ceiling-like room structure. In particular, fastening options known from other technical fields for use for suction points of a suction particle detection system are to be adapted to the requirements specified there.

SUMMARY OF THE INVENTION

The object is achieved according to the invention by a wall or ceiling feedthrough having the features of claim 1. The object is also achieved according to the invention by a use of a fastening means according to claim 11 and by an installation method according to claim 13.

A wall or ceiling feedthrough according to the invention of the type described at the beginning is distinguished in that the fastening means has one or more deflectable springs.

According to the inventive concept it is therefore provided that one or more springs are used which enable the wall or ceiling feedthrough, starting from the visible side of a wall-like or ceiling-like room structure, in particular a wall or ceiling, to be fastened on wall or ceiling paneling or an intermediate wall or a intermediate ceiling. In order to guide the fastening means, which has the one or more springs, through the through opening of a wall-like or ceiling-like room structure, these springs are designed to be deflectable, in particular able to be pretensioned or provided with a pretensioning force, from a starting position into a deflected position or a guide position. After the fastening means has passed the through opening, the one or more springs return, preferably only partially, to their starting position, so that the wall or ceiling feedthrough is fixed within the through opening by means of the one or more springs. Sections of the wall-like or ceiling-like room structure that delimit the passage opening can be arranged, preferably clamped and/or tensioned, between the one or more springs and the flange-like collar section, in particular the flange section.

With the wall or ceiling feedthrough according to the invention, which has one or more springs, it is therefore possible to fix a suction point of a suction particle detection system, in particular a suction fire detection system, from the visible side of a wall-like or ceiling-like room structure facing toward the test environment, without access to its rear side, within a through opening and to connect it to a pipe or hose end of the suction particle detection system, in particular the suction fire detection system. Additional fastening means such as screws, nuts, or the like can therefore be dispensed with. Since access behind the wall-like or ceiling-like room structure, i.e., to its rear, is no longer necessary for the installation of the wall or ceiling feedthrough, the suction points for a suction particle detection system can be planned free of predetermined structures, such as recessed lamps and/or inspection flaps, and/or provided at any location on the wall-like or ceiling-like room structure. Additional components for fixing the wall or ceiling feedthrough, such as retaining means or receiving nozzles or a two-part or multi-part embodiment of the wall or ceiling feedthrough itself, can also be avoided according to the invention. Finally, the wall or ceiling feedthrough can be installed simply and easily by inserting and/or clamping and/or snapping it into the through opening without additional installation tools.

In one preferred embodiment of the invention, the wall or ceiling feedthrough is designed as an integral component, at least in one piece with the line section, the collar section, and the suction opening.

An integral, i.e., one-piece component, in particular made of a thermoplastic material, may advantageously be produced as an injection-molded component in the injection molding method. Compared to two-part or multi-part embodiments, there are no additional installation steps, whereby installation time is saved, on the one hand, and installation errors, due to incorrectly assembled parts and/or due to fitting inaccuracies, which can occur during the production of individual parts, are reduced, on the other hand.

In an advantageous refinement of this embodiment, the one or more springs are also formed integrally, that is to say in one piece, with the wall or ceiling feedthrough. In this case, the one or more springs are preferably formed from the same, in particular thermoplastic, plastic material as the wall or ceiling feedthrough itself and can be produced integrally, i.e., in one piece, in a single production step with the wall or ceiling feedthrough in an embodiment as simple plastic springs.

According to an inventive design, the one or more springs are deflectable to guide the wall or ceiling feedthrough through the through opening into a guide position resting against the line section and/or extending in parallel to the line section.

In order to be able to introduce the wall or ceiling feedthrough into the through opening, the one or more springs are deflectable from a starting position, in particular in the direction of the line section of the wall or ceiling feedthrough, into a guide position, and/or can be pretensioned against a horizontal spring force component oriented in parallel to the collar section. In this guide position, the one or more springs are arranged resting against the line section or extending in parallel to it. In this way, the overall diameter of the fastening means of the wall or ceiling feedthrough can be reduced in such a way that it is insertable into the through opening until the flange-like collar section comes to rest on the visible side of the sections of the wall-like or ceiling-like room structure delimiting the through opening. In addition, the one or more springs, in their guide position, can enable a guided positioning, in particular a centered arrangement within the through opening and/or aligned with the pipe or hose end of the suction particle detection system, of the first line end.

According to a likewise advantageous design of the invention, a spring force oriented orthogonally to the collar section, in the direction of the second line end, can be exerted by means of the one or more springs.

In an advantageous refinement of this design of the invention, a pressing force can be exerted on the pipe or hose end by means of the one or more springs in an operating position of the wall or ceiling feedthrough connected to a pipe or hose end of the suction particle detection system in a fluid-conducting manner, wherein the pressing force results from the spring force oriented in the direction of the second line end.

In particular, the one or more springs are designed in such a way and/or their spring force is dimensioned in such a way that the one or more springs do not return completely into their original starting position even in the operating position of the wall or ceiling feedthrough, i.e., if it is fixed within the through opening and is connected in a fluid-conducting manner to a pipe or hose end of a suction particle detection system, in particular a suction fire detection system, so that at least one spring force component of the overall spring force can be exerted in the direction of the second line end. In the operating position of the wall or ceiling feedthrough, the sections of the wall-like or ceiling-like structure delimiting the through opening are arranged between the one or more springs and the flange-like collar section, so that at least one spring force component of the overall spring force can be exerted in the direction of the second line end, on the rear of these sections or orthogonally to these sections. In this way, the flange-like collar section is "pulled toward" the opposite visible side of the wall-like or ceiling-like room structure. The collar section extends in parallel to the wall-like or ceiling-like room structure and is formed having a larger diameter than the through opening, whereby the wall or ceiling feedthrough is clamped and/or tensioned within the through opening in the operating position by means of the one or more springs. The wall or ceiling feedthrough can thus be fixed solely on the basis of the spring force; additional retaining means, such as hooks or tongues or the like, can be dispensed with in this way. At the same time, the through opening may be concealed by means of the collar section, so that it is also designed as a visual safeguard.

In addition, the collar section can function as a fastening means for an optional reducing means, which can be connected to the collar section to reduce the cross-sectional area or the diameter of the suction opening. The suction openings of the pipe and/or hose system require fixedly defined diameters depending on the project planning, which can be easily implemented by means of the reducing means. The reducing means can be designed, for example, as a clip that can be snapped into the suction opening or, in the simplest embodiment, as a suction reducing film, which can be adhesively bonded on in particular, so that convenient installation not susceptible to errors is possible. By connecting the collar section having the suction opening to the reducing means, whistling noises which can occur when suctioning in ambient air or when removing representative amounts of air from the environment may be avoided. In addition, the reducing means enables the suction points to be visually marked, whereby the respective suction diameter can be determined and/or checked easily, for example on the basis of a color coding and/or inscription.

In the operating position of the wall or ceiling feedthrough, the spring force oriented orthogonally to the collar section in the direction of the second line end results in a pressing force which, counter to the spring force oriented in the direction of the second line end, is oriented in the direction of the first line end. The contact pressure is preferably transmitted indirectly to the pipe or hose end via the first line end. On the one hand, in this way, for example in conjunction with a conical first line end, the tightness of the fluid-conducting connection between the first line end and the pipe or hose end can be increased. Optionally or additionally, the applied pressing force can counteract a counterforce induced by a compressed and/or bent hose end, whereby the wall or ceiling feedthrough is prevented from being "pushed" out of the through opening by the hose end.

In one design of the invention, multiple springs can each be arranged opposite one another in pairs.

In the case of an even number as well as an odd number of springs, it is also expedient to arrange them at an identical angular distance from one another. With three springs the angular distance could be, for example, 120°, with four springs 90°. A regular arrangement of the springs with respect to one another can ensure a uniform distribution of the spring force acting on the rear side of the wall-like or ceiling-like room structure.

An optional advantageous embodiment of the invention is distinguished in that at least one, preferably all, of the one or more springs is designed, preferably are designed, as a spiral spring having a respective retaining clip. By using spiral springs, a particularly cost-effective embodiment of the invention can be implemented, in particular because of the low use of material. Due to the retaining clip acting as a lever, the springs are deflectable to lead through the through opening without great expenditure of force, so that the ceiling feedthrough is particularly easy to install in this embodiment.

In an advantageous design, the one or more spiral springs are connected directly, i.e., immediately, to the line section of the wall or ceiling feedthrough and have integral retaining clips.

According to a further advantageous design, at least one, preferably all, of the one or more springs is designed as a bent or kinked leaf spring having a first leg which is associated with the first line end of the line section and a second leg which is associated with the second line end of the line section. Springs embodied as leaf springs are particularly stable and robust and are therefore long-lived and low-maintenance. The pre-tensioning of the leaf springs and thus their shape is retained longer than in other embodiments.

In a refinement of this design, the length of the first leg is greater than the length of the second leg.

The legs of the one or more springs embodied as leaf springs preferably extend along the line section and/or extended parallel to the line section. In the case of curved or bent leaf springs, the transition from the first leg to the second leg usually takes place at the location of the smallest radius of curvature. Since the length of the first leg, which is associated with the first line end, is selected to be greater than the length of the second leg, which is associated with the second line end, which has the suction opening, the force required for introducing the wall or ceiling feedthrough into the through opening or the force required to deflect the one or more springs into the guide position is less than that required to remove the wall or ceiling feedthrough.

Finally, an inventive design is also advantageous in which at least one, preferably all, of the one or more springs is designed, preferably are designed, as an expanding spring spread out radially from the line section.

Such a design can be produced in a simple manner in the injection molding method. The springs having the line section are designed, for example, in the manner of an expansion anchor and/or as a simple plastic wing. In an expedient refinement, the wall or ceiling feedthrough can have multiple rows of springs arranged in the axial direction on the line section on spread-out springs, so that the same wall or ceiling feedthrough can be fixed within through openings having different wall thicknesses.

A use according to the invention is for a fastening means having one or more springs for fixing a wall or ceiling feedthrough for a suction particle detection system, in particular a suction fire detection system, in particular according to one or more of the above-described designs, within a through opening of a wall-like or ceiling-like room structure, wherein the wall-like or ceiling-like room structure has a visible side facing toward a test environment and a rear side facing away from the test environment.

The wall-like or ceiling-like room structure preferably delimits the test environment and/or at least partially borders it. A wall-like or ceiling-like room structure is to be understood as meaning, in particular, walls or ceilings, wall or ceiling paneling, and intermediate walls or intermediate ceilings, for example of a room in a building or means of transport. The visible side facing toward the room or the test environment is referred to as the visible side, and the side arranged opposite that is not visible and facing away from the room or the test environment is referred to as the rear side.

The use according to the invention is distinguished in that the wall or ceiling feedthrough has a line section having a first line end, which is connected in a fluid-conducting manner to a pipe or hose end of the suction particle detection system and has a collar section, which collar section extends in the radial direction starting from a second line end of the line section, wherein the wall-like or ceiling-like room structure is arranged between the one or more springs and the collar section and the one or more springs for exert a spring force orthogonal to the collar portion on the back of the wall-like or ceiling-like room structure for fixing.

The use according to the invention therefore provides using fastening means known per se from lighting technology and having one or more springs for installing a suction point of a suction particle detection system, in particular a suction fire detection system. For this purpose, the fastening means having one or more springs is connected, preferably integrally, to a line section of a wall or ceiling feedthrough or the fastening means is at least partially replaced by the line section. The line section has a first line end which is connected in a fluid-conducting manner to a pipe or hose end of the suction particle detection system, in particular the suction fire detection system. The second line end is formed having a suction opening and protrudes into the test environment or into the room delimited by the wall-like or ceiling-like room structure. The second line end of the line section also has a collar section which, starting from the line end, extends radially outward, in particular in parallel to the wall-like or ceiling-like room structure. For fastening, the one or more springs are arranged on the rear side and the collar section, which is designed in particular having a larger diameter than the diameter of the through opening, is arranged on the visible side of the wall-like or ceiling-like room structure, so that the wall or ceiling feedthrough is fastenable, in particular can be clamped and/or tensioned, within the through opening by means of the one or more springs. By means of the fastening means having one or more springs, a fluid-conducting line connection, which connects a pipe or hose end of a suction particle detection system, in particular a suction fire detection system, to a test environment may therefore be fixed and/or fastened in the form of a wall or ceiling feedthrough inside a through opening of a wall-like or ceiling-like room structure.

According to a preferred use, the first line end is connected to the pipe or hose end of the suction particle detection system, in particular the suction fire detection system, by means of a plug connection or a hose nozzle.

One advantageous use also provides that the one or more springs of the fastening means exert a pressing force resulting from a spring force on the pipe or hose end.

A plug connection can expediently be implemented in that the first line end of the line section is conical so that the first line end is pluggable into the pipe or hose end. Due to its conical design, the first line end can be plugged into pipe or hose ends having different diameters and also achieve particularly good sealing properties, so that leakage flows, which would lead to an unreliable measurement in conjunction with suction particle detection systems, can be avoided. Alternatively or additionally, the pipe or hose end can be adhesively bonded to the first line end.

By using one or more springs to fasten the wall or ceiling feedthrough within a through opening, a spring force, in particular a spring force component of a total spring force, is exerted orthogonally to the collar section, in the direction of the second line end, on the rear side of the wall-like or ceiling-like room structure that delimits the through opening. By means of the line section and the first line end, which is in particular conical, a pressing force resulting from the spring force acting orthogonally to the collar section in the direction of the second line end, in particular a spring force component, which in turn acts orthogonally to the collar section in the direction of the first line end, is transferred the pipe or hose end of the suction particle detection system, in particular the suction fire detection system. This pressing force is necessary in the special use according to the invention, to counteract a counterforce induced by a compressed and/or bent hose end, for example, and thus to prevent the wall or ceiling feedthrough from being "pushed"

out of the through opening by the hose end. Optionally or additionally, the tightness of the connection between the pipe or hose end and the first line end can be increased by the applied pressing force in order to avoid leakage flows.

Compared to the conventional fastening of suction points of a suction particle detection system, in which the hose ends protruding from the through opening are usually shortened using an additional tool, the novel use provides in particular compressing and/or bending a hose end protruding from the through opening during the introduction of the line section into the through opening. By using the fastening means according to the invention, on the one hand, additional tools can be dispensed with, and, on the other hand, due to the spring force of the fastening means and the counterforce induced by the compressed and/or bent hose end, which act against one another, the tightness of the fluid-conducting connection is increased.

According to the invention, an installation method is also provided for fixing a wall or ceiling feedthrough for a suction particle detection system, in particular a suction fire detection system, in particular according to one of the designs described above, within a passage opening of a wall-like or ceiling-like room structure having a visible side facing toward a test environment and a rear side facing away from the test environment, wherein in a first step a pipe and/or hose system of the suction particle detection system, which is arranged on the rear, behind the wall-like or ceiling-like room structure, is provided.

In a second step following the first step, a hose end of the pipe and/or hose system protruding out of the through opening is connected to a first line end of a line section of the wall or ceiling feedthrough in a fluid-conducting manner and in a third step following the second step, the wall or ceiling feedthrough is fixed by means of a fastening means having one or more springs inside the through opening, wherein the one or more springs are deflected in a guide position and the line section of the wall or ceiling feedthrough is introduced into the through opening, so that the one or more springs are arranged on the rear side of the wall-like or ceiling-like room structure, and a collar section arranged on a second line end of the line section is arranged on the visible side of the wall-like or ceiling-like room structure, so that a suction opening enclosed by the collar section points in a fluid-conducting manner into the test environment.

The one or more springs are preferably pre-tensioned or provided with a pre-tensioning force upon deflection from a starting position into the guide position, so that the one or more springs on the rear side of the wall-like or ceiling-like room structure return, in particular only partially, into their starting position, whereby a spring force is exerted on the rear side of the wall-like or ceiling-like room structure delimiting the through opening.

In a preferred embodiment of the method, the one or more springs are deflected into a guide position resting against the line section of the ceiling or wall feedthrough and/or extending in parallel to the line section Finally, an advantageous variant of the method is distinguished in that the hose end protruding from the through opening is compressed and/or bent during the introduction of the line section into the through opening.

Upon introduction of the wall or ceiling feedthrough into the through opening, the hose end connected to the first line end and initially protruding from the through opening is pushed behind the, i.e. to the rear side of the wall-like or ceiling-like room structure, wherein it is compressed and/or bent. A counterforce acting against the first line end is exerted by such a compressed and/or bent hose end. To prevent the wall or ceiling feedthrough from being "pushed" out of the through opening by the compressed and/or bent hose end, in particular the counter force exerted thereby, a spring force, in particular a spring force component, acting orthogonally to the collar section, in the direction of the second line end, of the one or more springs is to be selected so that an absolute value of a pressing force resulting from this spring force, which acts orthogonally to the collar section in the direction of the first line end, is equal to or preferably greater than the absolute value of the counter force.

It should be pointed out that the features and measures set forth individually in the preceding and following description can be combined with one another in any technically meaningful manner and disclose further designs of the invention. The description additionally characterizes and specifies the invention, in particular in conjunction with the figures.

BRIEF DESCRIPTION OF THE SEVERAL VIEWS OF THE DRAWINGS

Further advantageous designs of the invention are disclosed in the following description of the figures. In the figures

In the different figures, the same parts are always provided with the same reference numerals, because of which they are usually only described once.

DETAILED DESCRIPTION OF THE INVENTION

Figure 1:
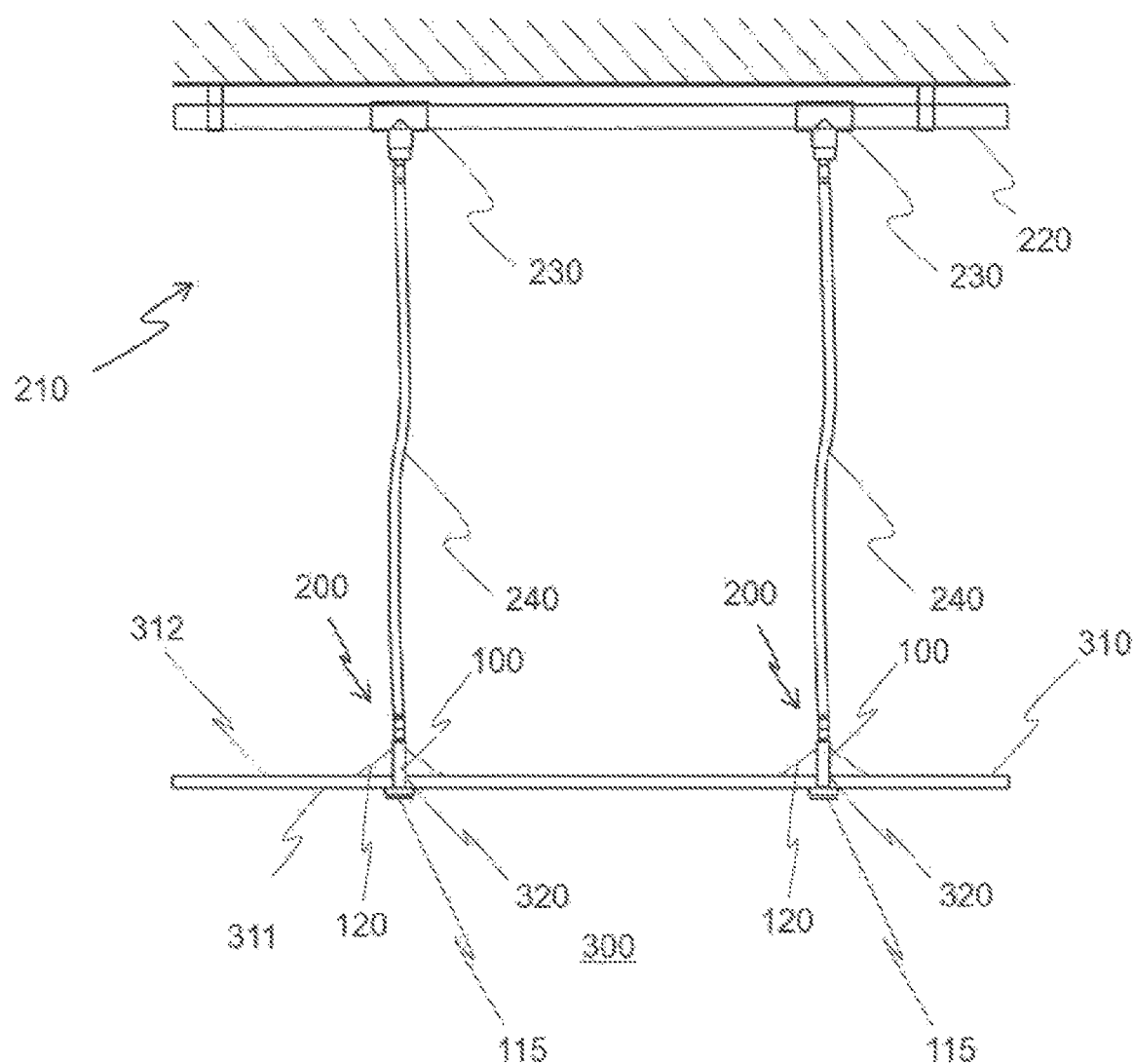
FIG. 1 shows a schematic illustration of a pipe and/or hose system of a suction particle detection system, which is connected to an exemplary embodiment of a wall or ceiling feedthrough according to the invention.

A schematic illustration of a section of a pipe and/or hose system 210 for a suction particle detection system, in particular for a smoke suction system, can be seen in FIG. 1. The illustrated section of the pipe and/or hose system 210 comprises a supply pipe 220 which is connected in a fluid-conducting manner to the detection chamber (not shown here) in order to supply it with a representative amount of air taken from a test environment 300. The test environment 300, which is preferably a room in a building or a means of transport, is adjoined by a wall-like or ceiling-like room structure 310; in particular, the test environment 300 is delimited by the wall-like or ceiling-like room structure 310. The wall-like or ceiling-like room structure 310 can be, for example, a wall or ceiling, wall or ceiling paneling, and an intermediate wall or intermediate ceiling of the room. The wall-like or ceiling-like room structure 310 has a visible side 311 facing toward the test environment 300 and an opposite rear side 312 facing away from the test environment 300 and is penetrated by two through openings 320. The pipe and/or hose system 210, is arranged, in particular hidden, behind, i.e. on the rear side 312 of the wall-like or ceiling-like room structure 310.

In order to enable the representative amount of air to be taken from the test environment 300, a respective suction hose 240 is connected to the supply pipe 220 in a fluid-conducting manner via an associated T-piece 230. The suction hoses 240 are each connected in a fluid-conducting manner by means of a first hose end 200 to a wall or ceiling feedthrough 100, in particular the first hose end 200 opens into the wall or ceiling feedthrough 100. The wall or ceiling feedthroughs 100 are each arranged within an assigned through opening 320 penetrating the wall-like or ceiling-like room structure 310 and protrude into the test environment 300 or open within the test environment 300. A fastening means 120 is provided in each case to fix the wall or ceiling feedthroughs 100.

Figure 2:
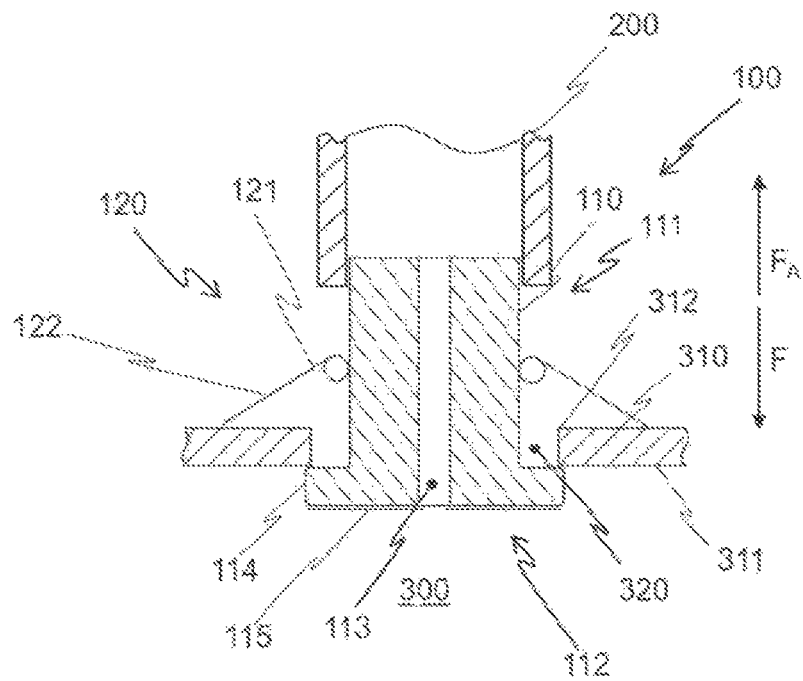
FIG. 2 shows a schematic sectional illustration of a first exemplary embodiment of a wall or ceiling feedthrough according to the invention having a fastening means having spiral springs.

FIG. 2 shows a schematic sectional illustration of a first exemplary embodiment of a wall or ceiling feedthrough 100 according to the invention for the fluid-conducting connection of a pipe or hose end 200 of a suction particle detection system (not shown), in particular a suction fire detection system, to a test environment 300 in an operating position. The test environment 300, which is preferably a room in a building or a means of transport, is adjoined by a wall-like or ceiling-like room structure 310; in particular, the test environment 300 is delimited by the wall-like or ceiling-like room structure 310. The wall-like or ceiling-like room structure 310 can be, for example, a wall or ceiling, wall or ceiling paneling, and an intermediate wall or intermediate ceiling of the room. The wall-like or ceiling-like room structure 310 has a visible side 311 facing toward the test environment 300 and an opposite rear side 312 facing away from the test environment 300 and is penetrated by a through opening 320, which is provided to accommodate a suction point and therefore to accommodate the wall or ceiling feedthrough 100. A line section 110 of the wall or ceiling feedthrough 100 comprising a first line end 111 and a second line end 112 is arranged, preferably centered, within the through opening 320. The first line end 111 is associated with the pipe or hose end 200 of the suction particle detection system and is connected to or plugged into it. The second line end 112 protrudes into the test environment 300 and has a suction opening 113, whereby the pipe or hose end 200 can be connected in a fluid-conducting manner to the environment 300 via the line section 110 in the operating position of the wall or ceiling feedthrough 100.

Starting from the second line end 112, a flange-like collar section 114 extends in the radial direction. The collar section 114 extends in parallel to the wall-like or ceiling-like room structure 310 and is associated with its visible side 311, in particular the collar section 114 rests against the visible side 311. A fastening means 120 is connected to the line section 110 and has two oppositely arranged springs 121, designed here as spiral springs. A retaining clip 122 extends in each case from the springs 121 and, in particular, is integrally connected to them. By means of the retaining clip 122, a spring force F, in particular a spring force component, acting orthogonally to the collar section 114 in the direction of the second line end 112, is exerted on the rear side 312 of the wall-like or ceiling-like room structure 310. The wall-like or ceiling-like room structure 310 delimiting the through opening 320 is therefore arranged and/or clamped or tensioned between the retaining clips 122 and the collar section 114. To lead the line section 110 through the through opening 320, the retaining clips 122 can be transferred by deflecting, in particular pretensioning, the springs 121 in the direction of the first line end 111, into a guide position extending in parallel to the line section 110, in particular into a guide position resting against the line section 110.

The collar section 114 can additionally be used to fasten a reducing means 115, for example a suction reducing film as shown here. The reducing means 115 is preferably designed having a circular surface and has an external diameter which is adapted to the external diameter of the collar section 114. An internal diameter of the reducing means 115 delimits an opening which is arranged centrally within the reducing means 115 and which is arranged coaxially to the suction opening 113 of the wall or ceiling feedthrough 100. Due to the smaller internal diameter of the reducing means 115 or the smaller opening, the cross-sectional area, in particular the diameter, of the suction opening 113 is reduced.

The reducing means 115 can alternatively also be designed as a clip. By attaching a reducing means 115 to a collar section 114, whistling noises, which possibly occur when ambient air is suctioned in or when the representative amount of air is removed from the environment 300, can be avoided. In addition, the reducing means 115 represents a simple option for the variable definition of a required cross-sectional area, in particular the diameter, i.e., the size of the suction opening 113 of a standard wall or ceiling feedthrough 100 and enables the suction points to be visually marked, whereby the respective cross-sectional area, in particular the diameter, can be determined and/or checked in a simple manner, for example on the basis of color coding or inscription.

In a connection with a hose end 200, before the line section 110 is guided through the through opening 320, its first line end 111 is usually plugged into the hose end 200, which initially protrudes from the through opening 320. Expediently, among other things to achieve an improved tightness, the first line end 111 is designed conically for this purpose and can additionally be adhesively bonded to the hose end 200. When the line section 110 is guided through or when the wall or ceiling feedthrough 100 is introduced into the through opening 320, the hose end 200 connected to the first line end 110 and initially protruding from the through opening 320 is pushed behind or to the rear side 312 of the wall-like or ceiling-like room structure 310, wherein this hose end is compressed and/or bent and therefore exerts a counterforce on the first line end 111. To prevent the bent and/or compressed hose end 200 from "pushing" the wall or ceiling feedthrough 100 out of the through opening 320, a spring force F, in particular a spring force component, of the two springs 121, which acts orthogonally to the collar section 114 in the direction of the second line end 112, is to be selected so that an absolute value of a pressing force $F_A$ resulting from this spring force F, which acts orthogonally to the collar section 114 in the direction of the first line end 111, is equal to or preferably greater than the absolute value of the counterforce.

Figure 3:
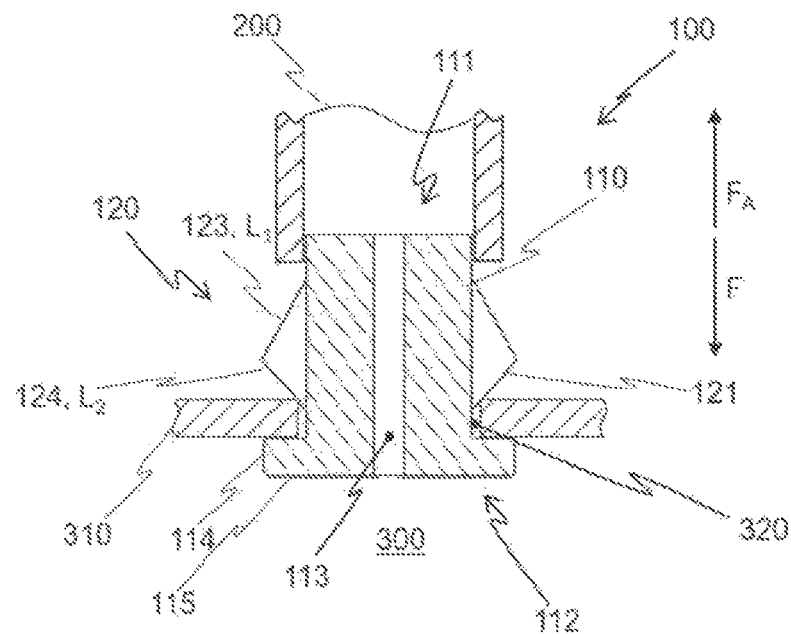
FIG. 3 shows a schematic sectional illustration of a second exemplary embodiment of a wall or ceiling feedthrough according to the invention having a fastening means having leaf springs.

FIG. 3 shows a schematic sectional illustration of a second exemplary embodiment of a wall or ceiling feedthrough 100 according to the invention having a line section 110, a collar section 114, and a fastening means 120 in an operating position. The second embodiment of the wall or ceiling bushing 100 differs from the first embodiment in that the fastening means 120 has two springs 121 designed as leaf springs instead of the spiral springs. The springs 121 designed as leaf springs each include a first leg 123, which is associated with the first line end 111, and a second leg 124, which is associated with the second line end 112.

In order to guide the line section 110 through the through opening 320 of the wall-like or ceiling-like room structure 310, the legs 123, 124 of the respective spring 121 can be deflected and/or pre-tensioned radially in the direction of the line section 110, so that they preferably rest against the line section 110. In order to facilitate fastening of the wall or ceiling feedthrough 100, the length $L_1$ of the first leg 123 is greater than the length $L_2$ of the second leg 124. Due to the different leg lengths $L_1 > L_2$, when the line section 110 is introduced in the direction of the pipe or hose end 200, a longer lever arm results, so that in this direction less application of force is required for the radial deflection of the springs 121. Conversely, when pulling out the line section 110, the application of force would be higher due to the shorter lever arm, whereby an improved hold of the wall or ceiling feedthrough 100 within the through opening 320 is achieved. An additional advantage of this embodiment variant is that the diameter of the through opening 320 can be designed approximately corresponding to the external diameter of the line section 110, since the legs 123, 124 in the guide position, when the line section 110 is guided through the through opening 320, can be applied almost completely to the line section 110.

Figure 4A:
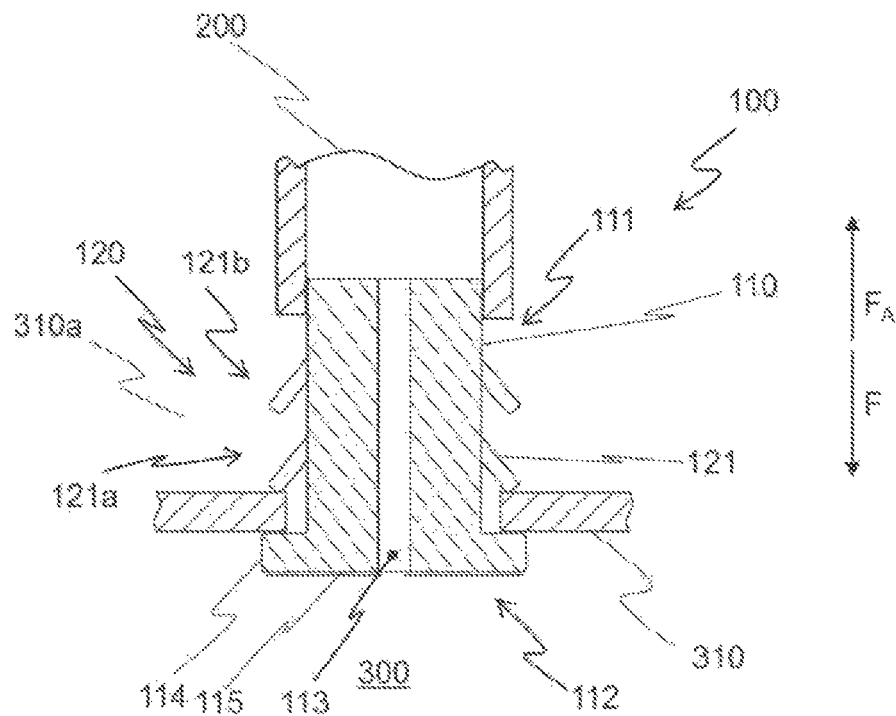
FIG. 4a shows a schematic sectional illustration of a third exemplary embodiment of a wall or ceiling feedthrough according to the invention having a fastening means having expansion springs.

FIG. 4a shows a schematic sectional illustration of a third exemplary embodiment of a wall or ceiling feedthrough 100 according to the invention having a line section 110, a collar section 114, and a fastening means 120. In an operating position, the wall or ceiling feedthrough 100 is connected in a fluid-conducting manner via the first line end 111 to a pipe and/or hose end 200. The second line end 112 of the line section 110 protrudes into a test environment 300. The third exemplary embodiment of the wall or ceiling feedthrough 100 shown in FIG. 3 differs from the previously described exemplary embodiments due to the fastening means 120, which here has four springs 121, which are each designed as expanding springs spread out radially from the line section 110. The springs 121 designed as expanding springs are arranged in rows along the line section 110, axially spaced apart from one another, wherein each two opposing springs 121 form a row of springs 121a, 121b. Because of this multi-row embodiment, it is possible to fix the wall or ceiling feedthrough 100 within through openings 320 having a different wall thickness. According to FIG. 4a, the wall-like or ceiling-like room structure 310 is arranged between the collar section 114 and a lower row of springs 121a associated with the second line end 112. The proposed number of rows of springs 121a, 121b and respective springs 121 arranged therein is only to be understood as an example. In the context of the invention, other, technically reasonable implementations having a different number of rows of springs 121a, 121b and/or springs 121 also come into consideration.

Figure 4B:
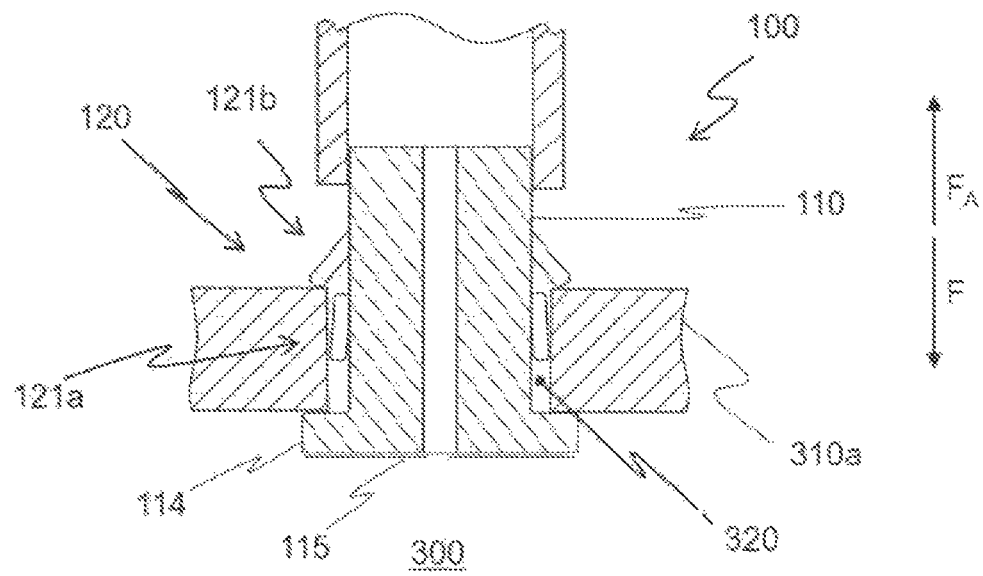
FIG. 4b shows a schematic sectional illustration of the third exemplary embodiment of a wall or ceiling feedthrough according to the invention having a fastening means having expansion springs inside a wall-like or ceiling-like room structure having a greater wall thickness.

Finally, FIG. 4b shows the exemplary embodiment of the wall or ceiling feedthrough 100 according to the invention according to FIG. 4a in a schematic sectional illustration. The wall or ceiling feedthrough 100 is arranged here within a through opening 320 of the wall-like or ceiling-like room structure 310a having a greater wall thickness than the wall-like or ceiling-like room structure 310 according to FIG. 4a. The wall-like or ceiling-like room structure 310a is arranged between an upper row of springs 121b of the fastening means 120, arranged above the lower row of springs 121a, and the collar section 114. In this case, the lower row of springs 121a rests against the line section 110, as well as in a guide position suitable for guiding the line section 110 through the through opening 320.

The exemplary designs of the wall or ceiling feedthrough 100 according to FIGS. 3, 4a, and 4b having springs 121 designed as leaf springs or springs 121 designed as expanding springs can be produced in a simple manner using the injection molding method, wherein the wall or ceiling feedthrough 100 is formed as an integral component, i.e., in one piece with the line section 110, the collar section 114, the suction opening 113, and the springs 121.

Overall, by means of the exemplary designs of the wall or ceiling feedthrough 100 according to the invention, a suction point for a suction particle detection system can be installed starting from the visible side 311 of a wall-like or ceiling-like room structure 310 without access to the rear side 312 being required. The configurations are each of a simple design and are therefore uncomplicated and inexpensive to produce and/or install without errors. A counterforce exerted by a compressed and/or bent hose end 200 can be counteracted by means of a pressing force $F_A$, which results from the spring force F of the one or more springs 121 designed as spiral springs, leaf springs, or expanding springs, in order to prevent the wall or ceiling feedthrough 100 from being "pushed" out of the through opening 320. For this purpose, the spring force F is to be designed taking the counterforce into account. Additionally or optionally, the tightness of the connection of the first line end 111 to the pipe or hose end 200 can be increased by means of the pressing force $F_A$.

LIST OF REFERENCE SIGNS 100 wall or ceiling feedthrough
110 line section
111 first line end
112 second line end
113 suction opening
114 collar section
115 reducing means
120 fastening means
121 spring
121a lower row of springs
121b upper row of springs
122 retaining clip
123 first leg
124 second leg
200 pipe or hose end
210 pipe and/or hose system
220 supply pipe
230 T-piece
240 suction hose
300 test environment
310 wall-like or ceiling-like room structure
310a wall-like or ceiling-like room structure having greater wall thickness
311 visible side
312 rear side
320 through opening
F spring force
$F_A$ pressing force
$L_1$ length of the first leg
$L_2$ length of the second leg

The invention claimed is:

1. A suction particle detection system having a wall or ceiling feedthrough (100) that connects a pipe or hose end (200) of the suction particle detection system to a test environment (300) in a fluid-conducting manner, the wall or ceiling feedthrough (100) having a line section (110) which has a first line end (111) for the fluid-conducting connection to the pipe or hose end (200) of the suction particle detection system and a second line end (112) arranged opposite to the first line end (111), wherein the second line end (112) is formed having a suction opening (113) protruding into the test environment (300),
a fastening means (120) for fixing the wall or ceiling feedthrough (100) within a through opening (320) of a wall or ceiling-like room structure (310), and
a flange-like collar section (114) which, starting from the second line end (112), extends in a radial direction,
characterized in that
the fastening means (120) comprises one or more deflectable springs (121), wherein the wall or ceiling feedthrough (100) is formed as an integral component, at least in one piece with the line section (110), the collar section (114), and the suction opening (113).

2. The suction particle detection system according to claim 1,
characterized in that
the one or more springs (121) for guiding the wall or ceiling feedthrough (100) through the through opening (320) are deflectable into a guide position resting against the line section (110) or extending in parallel to the line section (110).

3. The suction particle detection system according to claim 1,
characterized in that
by means of the one or more springs (121), a spring force (F) oriented orthogonally to the collar section (114) in a direction of the second line end (112) can be exerted.

4. The suction particle detection system according to claim 3,
characterized in that
a pressing force ($F_A$) can be exerted on the pipe or hose end (200) by means of the one or more springs (121), in an operating position of the wall or ceiling duct (100) connected to a pipe or hose end (200) of the suction particle detection system in a fluid-conducting manner, wherein the pressing force ($F_A$) results from the spring force (F) oriented in the direction of the second line end (112).

5. The suction particle detection system according to claim 1,
characterized in that
a reducing means (115) for reducing the cross-sectional area or the diameter of the suction opening (113) is connected to the collar section (114).

6. The suction particle detection system according to claim 1,
characterized in that
multiple springs (121) are arranged in pairs, opposite to one another.

7. The suction particle detection system according to claim 1,
characterized in that
at least one of the one or more springs (121) is designed as a spiral spring having a respective retaining clip (122).

8. The suction particle detection system according to claim 1,
characterized in that
at least one of the one or more springs (121) is designed as a bent or curved leaf spring having a first leg (123) which is associated with the first line end (111) of the line section (110) and a second leg (124) which is associated with the second line end (112) of the line section (110).

9. The suction particle detection system according to claim 1,
characterized in that
at least one of the one or more springs (121) is designed as an expansion spring spread out radially from the line section (110).

10. The suction particle detection system according to claim 1,
characterized in that
the fastening means (120) having one or more springs (121) being used for fixing the wall or ceiling feedthrough within a through opening (320) of a wall-like or ceiling-like room structure (310), wherein the wall-like or ceiling-like room structure (310) has a visible side (311) facing toward the test environment (300) and a rear side (312) facing away from the test environment (300)
wherein the wall-like or ceiling-like room structure (100) is arranged between the one or more springs (121) and the collar section (114) and the one or more springs (121) exert a spring force (F) orthogonally to the collar section (114) on the rear side (312) of the wall-like or ceiling-like room structure (310) for fixing.

11. The suction particle detection system—according to claim 10,
characterized in that
the first line end (111) is connected to the pipe or hose end (200) of the suction particle detection system by means of a plug connection or a hose nozzle.

12. The suction particle detection system according to claim 10,
characterized in that
the one or more springs (121) of the fastening means (120) exert a pressing force (FA) resulting from a spring force (F) on the pipe or hose end (200).

13. A method for fixing a wall or ceiling feedthrough (100) for a suction particle detection system according to claim 1 within a through opening (320) of a wall-like or ceiling-like room structure (310) having a visible side (311) facing toward a test environment (300) and a rear side (312) facing away from the test environment (300), wherein
in a first step, a tube or hose system (210) of the suction particle detection system, arranged on the rear, behind the wall-like or ceiling-like room structure (310),
in a second step following the first step, a hose end (200) of the tube or hose system protruding from the through opening (320) is connected in a fluid-conducting manner to a first line end (111) of a line section (110) of the wall or ceiling feedthrough (100), and
In a third step following the second step, the wall or ceiling feedthrough (100) is fixed by means of a fastening means (120) having one or more springs (121) within the through opening (320), wherein the one or more springs (121) are deflected into a guide position and the line section (110) of the wall or ceiling feedthrough (100) is introduced into the through opening (320), so that the one or more springs (121) are arranged on the rear side (312) of the wall-like or ceiling-like room structure (310), and a collar section (114) arranged on a second line end (112) of the line section (110) is arranged on the visible side (311) of the wall-like or ceiling-like room structure (310), so that a suction opening (113) enclosed by the collar section (114) points in a fluid-conducting manner into the test environment (300), wherein the wall or ceiling feedthrough (100) is formed as an integral component, at least in one piece with the line section (110), the collar section (114), and the suction opening (113), and wherein the hose end (200) protruding from the through opening (320) is compressed or bent during the introduction of the line section (110) into the through opening (320).

14. The method according to claim 13, characterized in that the one or more springs (121) are deflected into a guide position resting against the line section (110) of the ceiling or wall feedthrough (320) or extending in parallel to the line section (110).

\* \* \* \* \*